United States Patent
Park et al.

(10) Patent No.: US 11,358,334 B2
(45) Date of Patent: Jun. 14, 2022

(54) FOUR-DIMENSIONAL PRINTING METHOD USING THERMAL ANISOTROPY AND THERMAL TRANSFORMATION, AND THE RESULTING PRODUCT

(71) Applicant: Foundation For Research and Business, Seoul National University of Science and Technology, Seoul (KR)

(72) Inventors: Keun Park, Seoul (KR); Bona Goo, Daejeon (KR)

(73) Assignee: Foundation For Research and Business, Seoul National University of Science and Technology

( * ) Notice: Subject to any disclaimer, the term of this patent is extended or adjusted under 35 U.S.C. 154(b) by 170 days.

(21) Appl. No.: 16/528,223

(22) Filed: Jul. 31, 2019

(65) Prior Publication Data

US 2020/0282649 A1    Sep. 10, 2020

(30) Foreign Application Priority Data

Mar. 5, 2019  (KR) .......................... 10-2019-0025118

(51) Int. Cl.
*B29C 64/118* (2017.01)
*B29C 64/264* (2017.01)
(Continued)

(52) U.S. Cl.
CPC .......... *B29C 64/264* (2017.08); *B29C 64/118* (2017.08); *B29C 64/295* (2017.08); *B33Y 10/00* (2014.12); *B33Y 30/00* (2014.12)

(58) Field of Classification Search
CPC ... B29C 64/264; B29C 64/118; B29C 64/295; B29C 64/393; B29C 64/188;
(Continued)

(56) References Cited

U.S. PATENT DOCUMENTS

| 2002/0019683 A1* | 2/2002 | White | B33Y 50/02 |
| | | | 700/255 |
| 2016/0067928 A1* | 3/2016 | Mark | B29C 70/16 |
| | | | 425/150 |

(Continued)

OTHER PUBLICATIONS

Zhou, Y., Huang, W.M., Kang, S.F. et al. From 3D to 4D printing: approaches and typical applications. J Mech Sci Technol 29, 4281-4288 (2015). Accessed at https://doi.org/10.1007/s12206-015-0925-0 Mar. 15, 2021. (Year: 2015).*

(Continued)

*Primary Examiner* — Joseph S Del Sole
*Assistant Examiner* — Jamel M Nelson
(74) *Attorney, Agent, or Firm* — Mendelsohn Dunleavy, P.C.

(57) ABSTRACT

Disclosed are a 4D printing method using thermal anisotropy and thermal transformation, and the resulting product. The method includes (a) artificially planning transverse printing paths and longitudinal printing paths on a specimen to impose a thermal anisotropy to the specimen, (b) sequentially and alternately forming transversely printed layers and longitudinally printed layers on the specimen by printing a thermoplastic polymer in transverse and longitudinal directions to build a 3D printed product, (c) heating the 3D printed product so that the 3D printed product thermally transforms in a specific direction, and (d) controlling heating time to obtain a 4D printed product having a desired final shape which is formed through the transformation of the 3D printed product over the heating time.

12 Claims, 11 Drawing Sheets

(51) Int. Cl.
*B29C 64/295* (2017.01)
*B33Y 30/00* (2015.01)
*B33Y 10/00* (2015.01)

(58) Field of Classification Search
CPC ....... B29C 64/30; B29C 64/286; B33Y 30/00; B33Y 10/00; B33Y 40/20; B33Y 50/02
See application file for complete search history.

(56) References Cited

U.S. PATENT DOCUMENTS

2017/0151733 A1* 6/2017 Lewis .................. B29C 64/106
2018/0326660 A1* 11/2018 Gifford ................ B29C 64/241
2019/0009358 A1* 1/2019 Vorontsov .............. H01S 3/005

OTHER PUBLICATIONS

Zhou,Y.,Huang,W.M.,Kang,S.F.etal. From3Dto4Dprinting:approachesandtypicalapplications. JMechSciTechnol29,4281-4288(2015) . Accessedathttos://doi.org/10.1007/s12206-015-0925-0 Mar. 15, 2021. (Year: 2015).*
Lee,A.Y,An,J.,Chua,C.K., "Two-Way4DPrinting:AReviewontheReversibilityof3D-PrintedShapeMemoryMaterials", PublishedbyElsevierLTD,Engineering3(2017)663-674(2017). Accessedatreaser.elsevier.com on Dec. 12, 2021. (Year: 2017).*

* cited by examiner

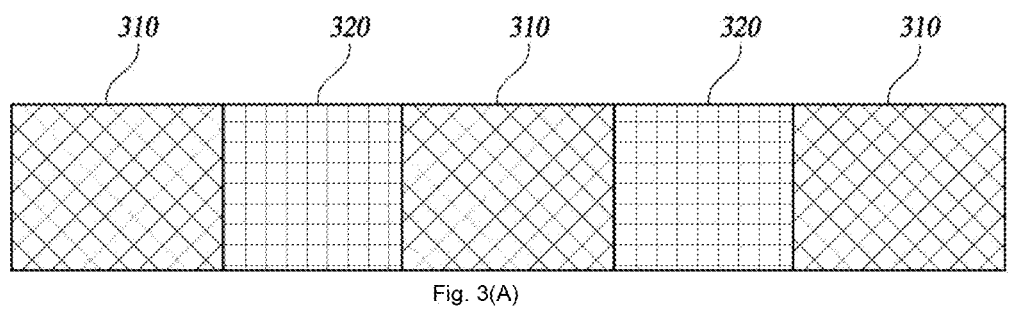
Fig. 3(A)
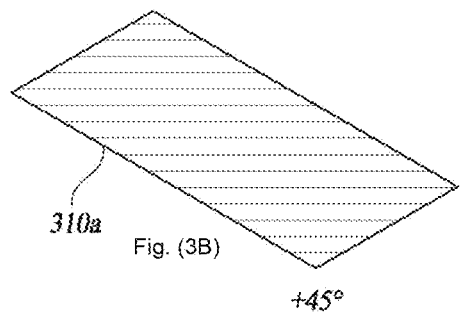
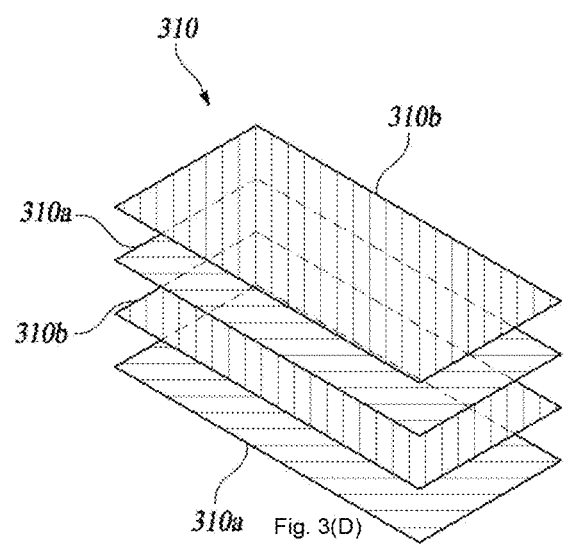

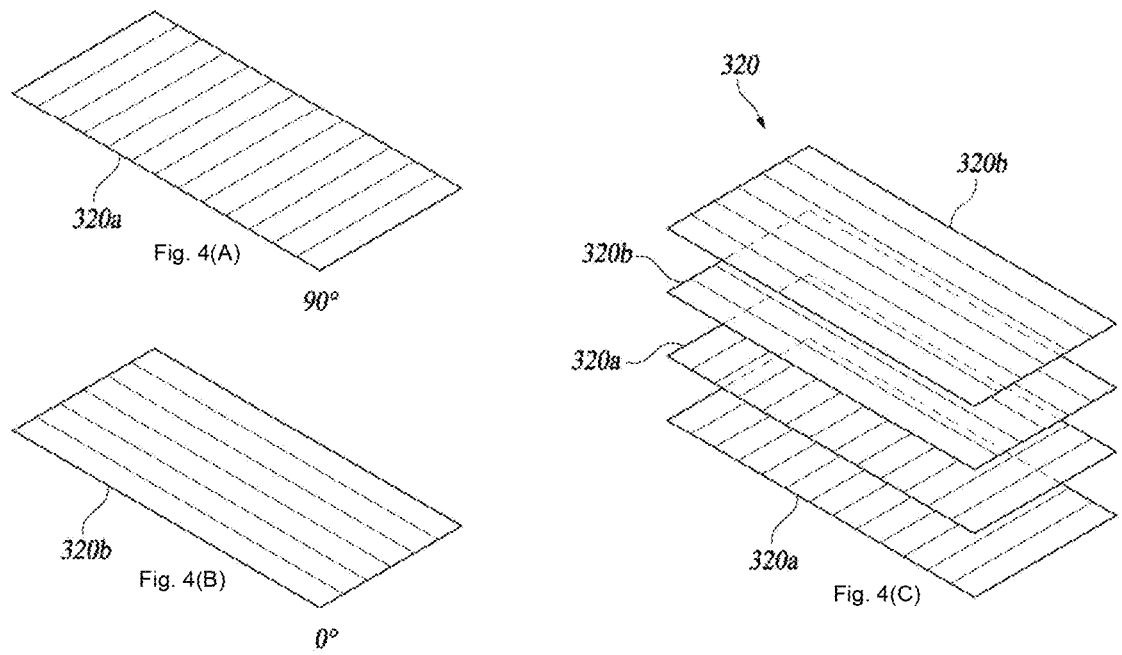
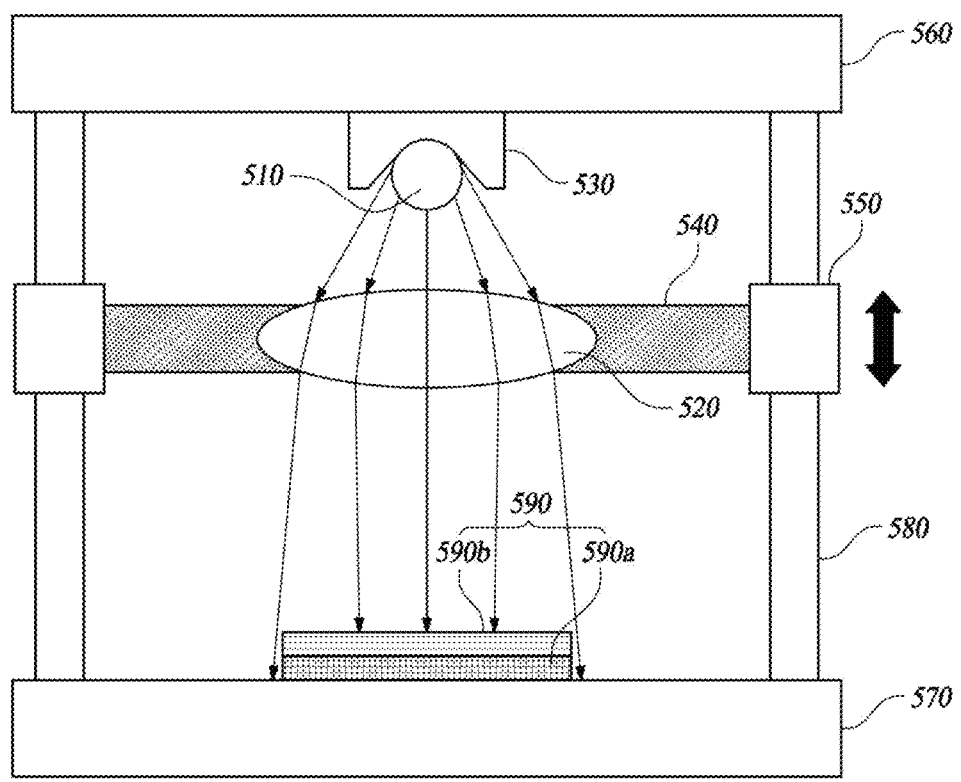
Fig. 5

Fig. 9
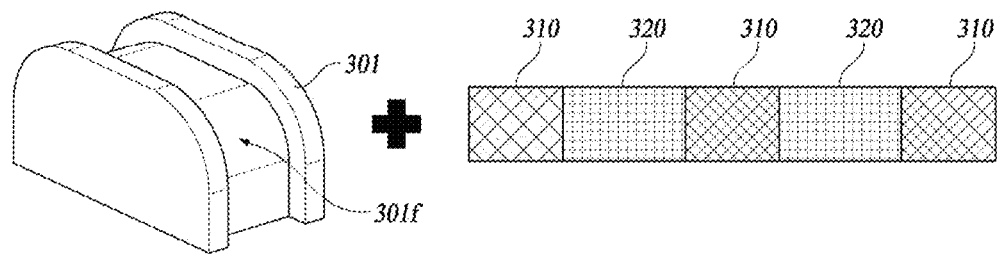
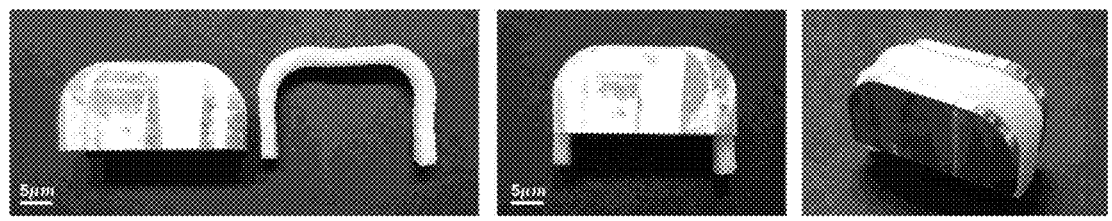
Fig. 10
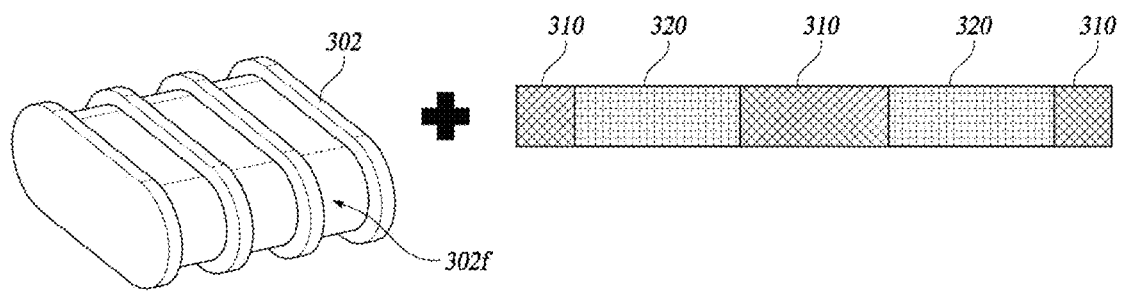
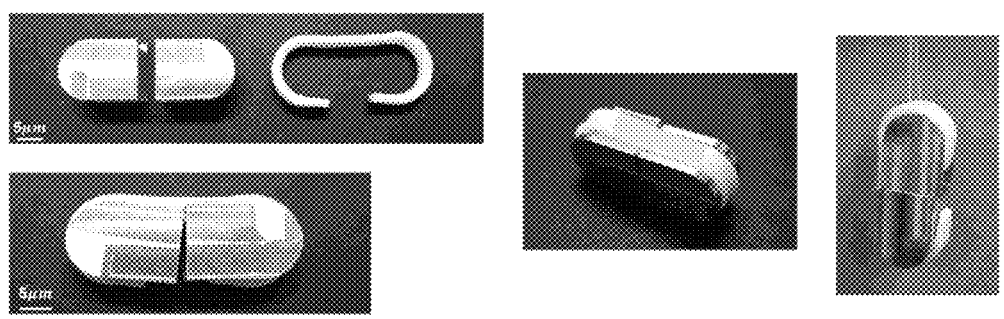

longitudinal direction     transverse direction

Fig. 14
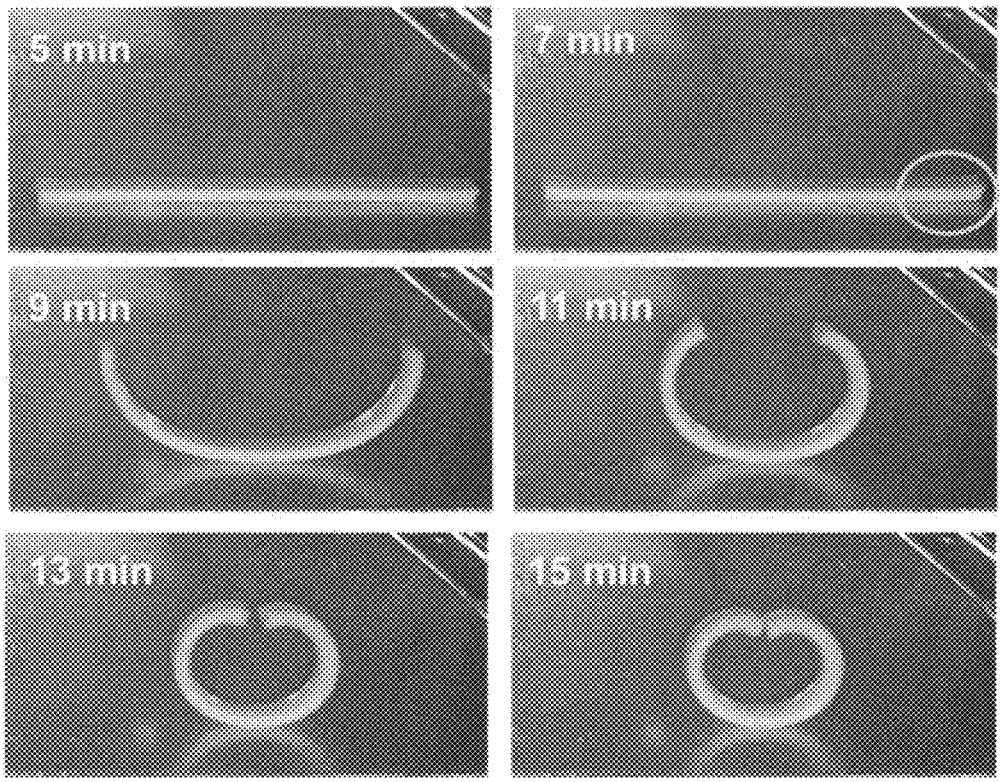
Fig. 15(A)  Fig. 15(B)  Fig. 15(C)
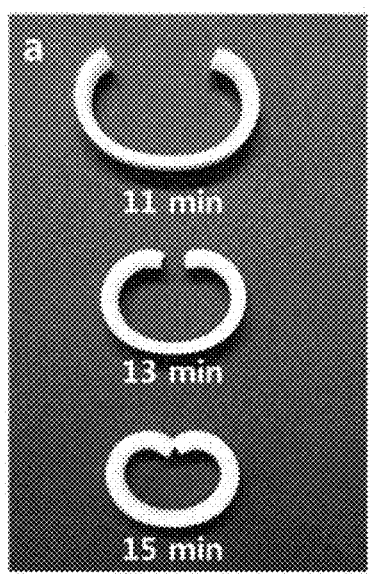 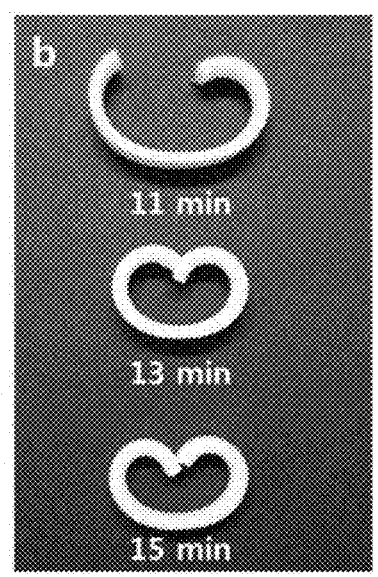 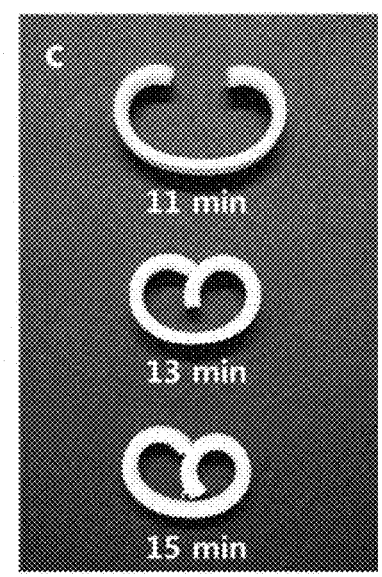

FOUR-DIMENSIONAL PRINTING METHOD USING THERMAL ANISOTROPY AND THERMAL TRANSFORMATION, AND THE RESULTING PRODUCT

CROSS REFERENCE TO RELATED APPLICATION

The present application claims priority to Korean Patent Application No. 10-2019-0025118 (filed Mar. 5, 2019), the entire contents of which is incorporated herein for all purposes by this reference.

BACKGROUND OF THE DISCLOSURE

1. Field of the Disclosure

The present invention relates to a four-dimensional (4D) printing method using thermal anisotropy and transformation of three-dimensionally (3D) printed products. More particularly, the present invention relates to a 4D printing method based on thermal anisotropy and transformation and to the resulting product, the method being capable of realizing 4D printing by producing an object having anisotropy without using a dedicated 3D printer and material for 4D printing and by causing thermal transformation of the object in a desired direction.

2. Description of the Background Art 4D printing refers to a technique of adding the dimension of transformation over time to the techniques of 3D printing. That is, 4D printing is a process control method in which a self-transformable object is first fabricated through 3D printing techniques and then the object changes its form in a desired direction over time by reacting with parameters (for example, heat, humidity, vibration, gravity, air, etc.) within the environment or with an energy source.

4D printing involves deposition of a smart material such as shape-memory material or hydrogel, or deposition of materials with different swelling properties, in successive layers to create a 3D object. Thus, 4D printing requires a dedicated 3D printer capable of printing different materials or smart materials in successive layers. Therefore, it was difficult to commercially use the techniques of 4D printing in various industrial fields.

Korean Patent No. 10-1885474 (Patent Literature 1) discloses "4D Printing Apparatus Having Dual Nozzle". This 4D printing apparatus includes a first nozzle for jetting a first material using a first 3D printing technique (hereinafter, referred to as an A technique, for example, photopolymer jetting) and a second nozzle for jetting a second material using a second 3D printing method (hereinafter, referred to as a B technique, for example, fused deposition modeling (FDM)). The first material is a photo-curing material containing conductive paste. The second material is filament of a mixture of shape-memory polymer (SMP), multifunctional carbon nanotube (CNT), and super absorbent polymer (SAP) and has a critical environment condition. The first and second materials differ in glass transition temperature by 55° C.

Patent Literature 1 has an advantage of producing a smart material-based 3D object through a single batch process by jetting the first material through the 3D printing technique A from the first nozzle and the second material through the 3D printing technique B from the second nozzle. However, this method has limitations in commercial success and marketability because it also requires a dedicated 3D printer manufactured to print multiple materials or a smart material. Another disadvantage of this method is that it is difficult to prepare obtain materials having a high glass transition temperature difference, for example, by a difference of 55° or more, to improve the performance of a shape-memory device made of a smart composite material composed of the two materials.

SUMMARY OF THE DISCLOSURE

The present invention has been made in view of the problems occurring in the related art, and an objective of the present invention is to provide a 4D printing method using thermal anisotropy and thermal transformation and the resulting product, the method being capable of producing a 3D printed product with anisotropy by using a general 3D printing material and printer (for example, an FDM printer and a thermoplastic filament), requiring neither a dedicated 3D printer nor a dedicated smart material, and then causing thermal transformation of the 3D printed product in a specific direction through a thermal process such as heat treatment to produce a 4D printed product with a desired final shape.

In order to the accomplish the objective of the present invention, there is provided a 4D printing method using thermal anisotropy and thermal transformation, the method including: (a) artificially planning transverse printing paths and longitudinal printing paths on a specimen to impose a desired thermal anisotropy to the specimen; (b) printing a thermoplastic polymer in a transverse direction and a longitudinal direction to form multiple transversely printed layers and multiple longitudinally printed layers to build a 3D printed product; (c) heating the 3D printed product to cause thermal transformation of the 3D printed product in a specific direction; and (d) controlling heating time to obtain a 4D printed product having a desired final shape formed through the transformation of the 3D printed product.

In the (b), the thermoplastic polymer may be a form of a filament.

In the (b), the printing of the thermoplastic polymer in the transverse direction and the longitudinal direction on the specimen may be performed by using a fused deposition modeling (FDM) type 3D printer.

In addition, in the (b), in the printing of the thermoplastic polymer in the transverse direction and the longitudinal direction on the specimen, at least one anisotropic printing region may be set within isotropic printing regions to cause local thermal transformation, and anisotropic printing may be performed for the anisotropic region.

In this case, the isotropic printing region may have a laminate structure composed of multiple +45° oblique layers printed along a +45° oblique printing path and multiple −45° oblique layers formed along a −45° oblique printing path, in which the +45° oblique layers and the −45° oblique layers are alternately laminated.

The anisotropic printing region may have a laminate structure composed of multiple transverse layers formed along a transverse printing path and multiple longitudinal layers formed along a longitudinal printing path, in which the transverse layers and the longitudinal layers are laminated.

In addition, in the (c), in the heating of the 3D printed product to cause the thermal transformation of the 3D printed product in a specific direction, the number of the multiple transverse layers and the number of the multiple longitudinal layers may be varied to control the degrees of transformation in the transverse direction and in the longitudinal direction.

In addition, in the (c), in the heating of the 3D printed product, the heating may be performed at a temperature equal to or higher than a glass transition temperature of the polymer for a predetermined period of time.

In addition, in the (c), in the heating of the 3D printed product, a light irradiating device may be used to heat the 3D printed product using light energy.

The light irradiating device may include a light source for emitting a light ray and a lens that changes a ray path of the light emitted from the light source such that the light ray is directed to the 3D printed product, in which a light irradiation region may be controlled by adjusting a distance between the 3D printed product and the lens disposed above the 3D printed product.

In addition, in the heating of the 3D printed product with the light energy, when the 3D printed product is a product including isotropic printing regions and anisotropic printing regions, the light irradiating device may include a light source for emitting a light ray, a lens for changing a ray path of the light emitted from the light irradiating device such that the light ray is directed to the 3D printed product, and a mask having a through hole transmitting only a part of the light ray passing through the lens, in which the mask is used to focus the light ray only on the anisotropic printing region.

Wherein, the light source may be an infrared lamp.

In addition, in the (d), in the obtaining of the 4D printed product having the desired final shape through the anisotropic thermal transformation, the specimen configured to cause local thermal transformation may be applied to a base component having a specific shape with at least one folding region where the specimen is automatically assembled with the base component due to the local thermal transformation region of the specimen corresponding to the folding region, thereby producing an integrated 4D product.

According to another aspect of the present invention, there is provided a 4D printed product produced by using a 4D printing method using thermal anisotropy and thermal transformation, the product being produced by sequentially forming multiple transverse layers and multiple longitudinal layers on a specimen by printing a thermoplastic polymer in a transverse direction and a longitudinal direction to form a 3D printed product, heating the 3D printed product to cause thermal transformation of the 3D printed product in a specific direction, and controlling heating time to obtain a 4D printed product that transforms into a desired final shape through the transformation.

Herein, when printing the thermoplastic polymer material on the specimen in the transverse direction and the longitudinal direction, at least one anisotropic printing region is set within isotropic printing regions to cause local thermal transformation, and then anisotropic printing is performed on the anisotropic printing region.

The isotropic printing region may have a laminate structure in which multiple +45° oblique layers formed along a +45° oblique printing path and multiple −45° oblique layers having a −45° oblique printing path are alternately and sequentially laminated.

The anisotropic printing region may have a laminate structure in which multiple transverse layers formed along a transverse printing path and multiple longitudinal layers formed along a longitudinal printing path are alternatively sequentially laminated.

The 4D printed product having a desired shape may be an integrated 4D product that is obtained by applying a specimen having ability to cause local thermal transformation to a base component having a specific shape and at least one folding region where the specimen can be automatically assembled with the base component due to the local thermal transformation of the specimen.

The present invention described above has an advantage of implementing a 4D printed product having a desired transformed shape by artificially imparting a desired anisotropy to a 3D printed product using general printing materials and equipment, without requiring special materials or equipment for 4D printing, and by heating the printed product to cause thermal transformation of the printed product in a specific direction.

BRIEF DESCRIPTION OF THE DRAWINGS

The above and other objects, features and other advantages of the present disclosure will be more clearly understood from the following detailed description when taken in conjunction with the accompanying drawings, in which:

FIGS. 3(A), 3(B), 3(C) and 3(D) are views illustrating the 4D printing method according to one embodiment of the present invention and, more particularly, illustrating a state in which anisotropic printing regions are set within isotropic printing regions and a state in which a number of isotropically printed layers are laminated;

FIGS. 4(A), 4(B) and 4(C) are views illustrating a state in which a number of anisotropically printed layers are laminated;

FIG. 5 is a view illustrating a process of heating a 3D printed product using an infrared light irradiating device, regarding the 4D printing method according to one embodiment of the present invention;

FIGS. 9 and 10 are views illustrating a process of assembling a 3D printed product with a component using the local thermal transformation of the 3D printed product, regarding the 4D printing method according to the present invention;

FIG. 14 is a view illustrating changes, with a heating time, in shape of an anisotropic specimen composed of transversely printed layers and longitudinally printed layers in which a ratio of the number of the transversely printed layers and the number of the longitudinally printed layers is 3:5;

FIGS. 15(A)-(C) are views illustrating changes, with a heating time, in shape of anisotropic specimens composed of transversely printed layers and longitudinally printed layers in which the ratios of the number of the transversely printed layers and the number of the longitudinally printed layers are 3:5, 4:4, and 5:3, respectively.

DETAILED DESCRIPTION OF THE DISCLOSURE

Unless the context clearly indicates otherwise, it will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Also, the terms "~part", "~unit", "module", "apparatus" and the like mean a unit for processing at least one function or operation and may be implemented by a combination of hardware and/or software.

Hereinafter, preferred embodiments of the present invention will be described below with reference to the accompanying drawings.

Figure 1:
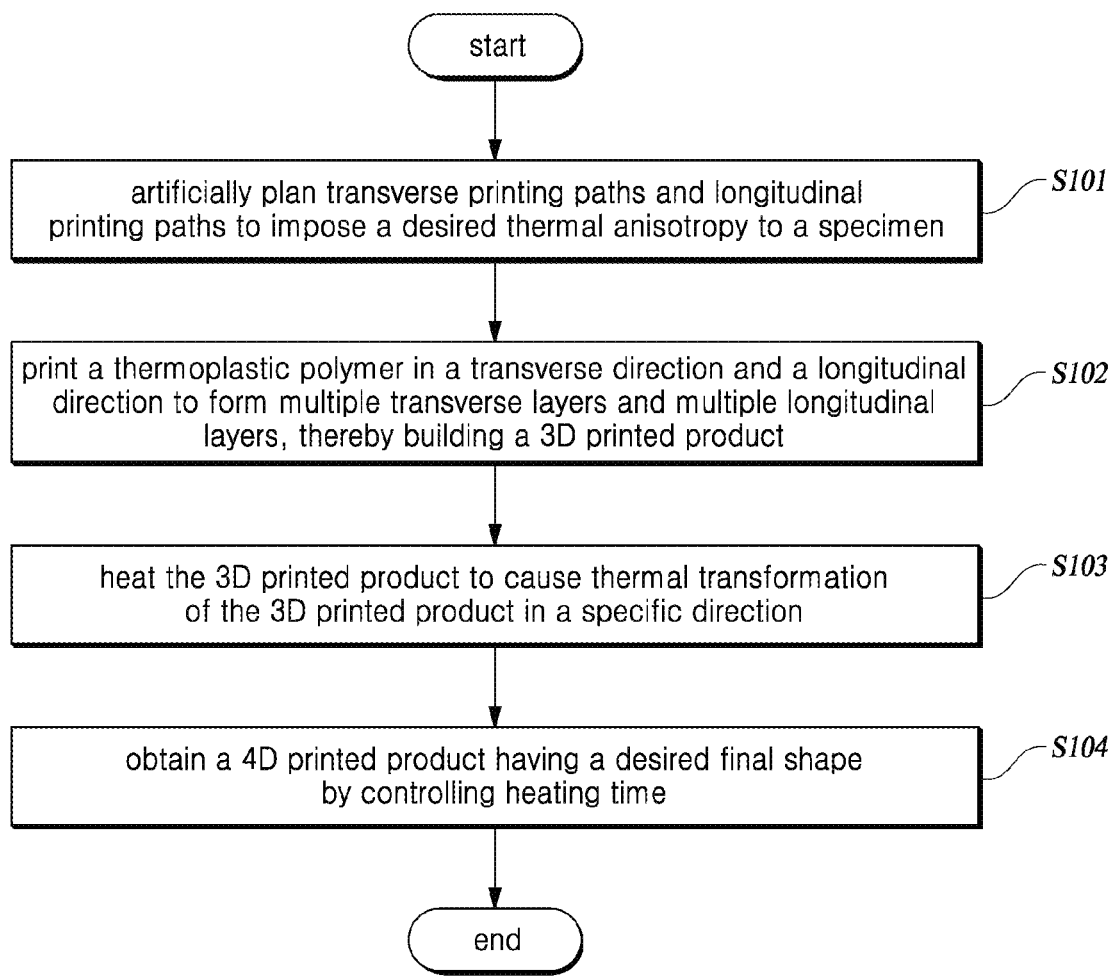
FIG. 1 is a flowchart illustrating a 4D printing method using thermal anisotropy and thermal transformation, according to one embodiment of the present invention.

FIG. 1 is a flowchart illustrating a 4D printing method using thermal anisotropy and thermal transformation, according to one embodiment of the present invention.

Referring to FIG. 1, the 4D printing method according to the present invention includes a process (Step S101) of planning transverse printing paths and longitudinal printing paths on a specimen 110 (see FIG. 2) to impose a desired thermal anisotropy to the specimen 110.

Figure 2:
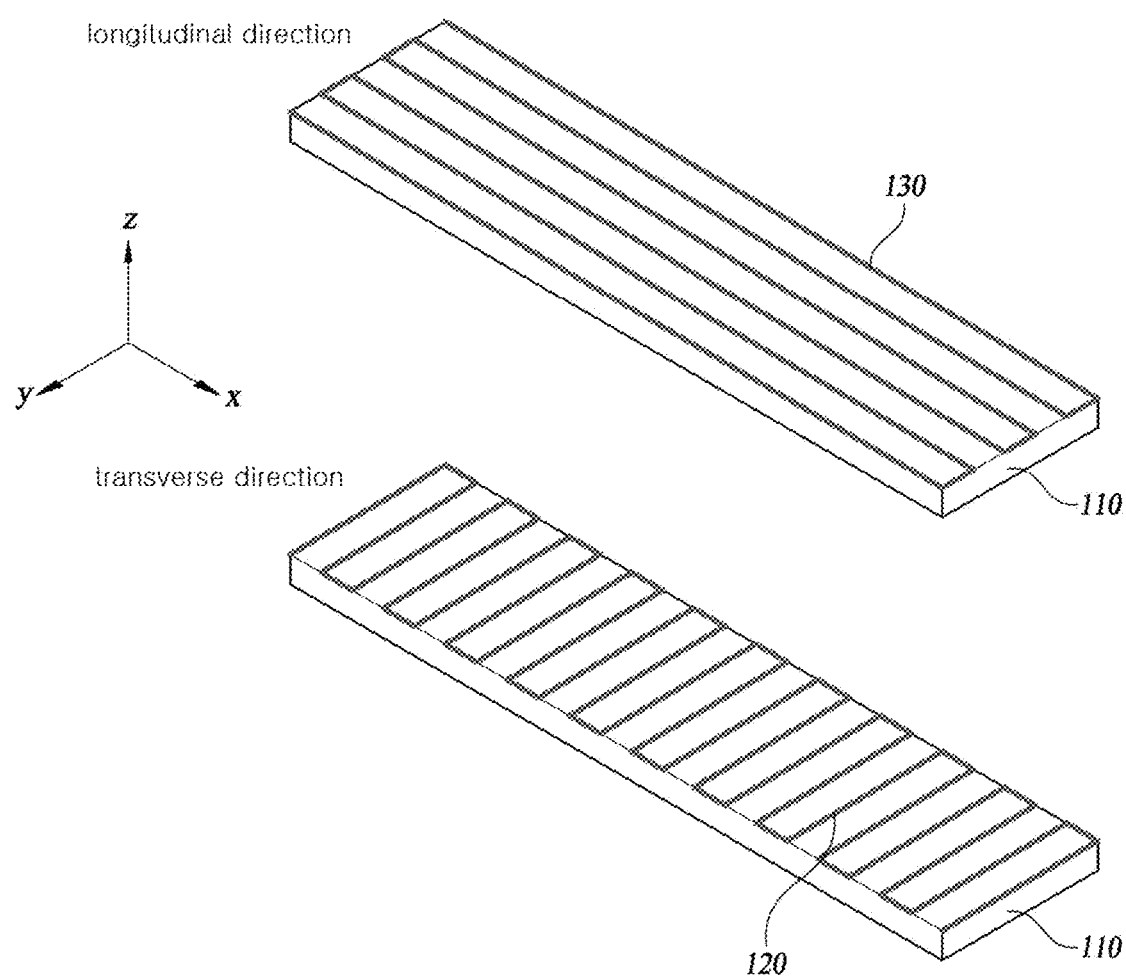
FIG. 2 is a view illustrating the cross section of a transverse printing path and the cross section of a longitudinal printing path of a printed structure during the 4D printing method according to one embodiment of the present invention.

Next, as illustrated in FIG. 2, a thermoplastic polymer is printed on the specimen 110 in a transverse direction and a longitudinal direction such that multiple transverse layers 120 and multiple longitudinal layers 130 are sequentially laminated to build a 3D printed product (Step S102). Here, the thermoplastic polymer may be a form of a filament. Transverse-pass printing and longitudinal-pass printing of the thermoplastic polymer on the specimen 110 are performed by using a fused deposition modeling (FDM) type 3D printer. When the thermoplastic polymer is printed in the transverse direction and in the longitudinal direction by using the FDM type 3D printer, each of the transverse and longitudinal layers is formed to be continuous. This printing method has an advantage of shortening the time for printing. Alternatively, the printing can be performed such that each of the transverse and longitudinal layers is composed of multiple disconnected lines.

Here, the process of printing the thermoplastic polymer in the transverse and longitudinal directions on the specimen 110 using the FDM type 3D printer will be described below in greater detail.

In order to maintain the isotropy when performing the FDM printing, generally, +45° oblique printing paths and −45° oblique printing paths are alternately set. However, as illustrated in FIG. 2, when the thermoplastic polymer is printed in one direction, either the transverse direction or the longitudinal direction, the printed layer of the thermoplastic polymer has a strong anisotropy. For example, in an experiment in which acrylonitrile butadiene styrene (ABS) was printed on a rectangular bar specimen that is 60 mm long, 6 mm wide, and 1.6 mm thick, in a transverse direction and then a longitudinal direction, and the specimen is then heated to a temperature of 150° C., changes in dimension for each direction and thermal expansion coefficients $\alpha i$ were observed as shown in Table 1.

TABLE 1

| Printing direction | Dimensions | Before heating (mm) | After heating (mm) | $\alpha_i$ ($\times 10^{-3}$/° C.) |
|---|---|---|---|---|
| Longitudinal-pass printing | Length (x) | 59.89 | 48.18 | −1.53 |
| | Width (y) | 6.41 | 7.19 | 0.95 |
| Transverse-pass printing | Length (x) | 60.01 | 61.25 | 0.16 |
| | Width (y) | 6.15 | 5.83 | −0.40 |

Referring to Table 1, in the case of the longitudinal-pass printing, the specimen transformed such that the length x decreased and the width y increased after the heating. On the other hand, the case of the transverse-pass printing, the opposite transformation occurred. That is, the specimen transformed such that the length x decreased and the width y increased. This is because tensile residual stress occurs in the longitudinal direction and compressive residual stress occurs in the width direction when the material is extruded during the FDM printing process.

When the thermoplastic polymer is printed on the specimen 110 in the transverse direction and the longitudinal direction to sequentially stack multiple transverse layers 120 and multiple longitudinal layers 130 having different thermal transformation characteristics, the transverse-pass printing is performed first to form m transverse layers and then the longitudinal-pass printing is performed to form n longitudinal layers on the stack of the m transverse layers.

The number of the transverse layers is not limited to m and the number of the longitudinal layers is not limited to n. There can be many variations in the laminate structure. For example, the transverse-pass printing may be performed to form n transverse layers first and then the longitudinal-pass printing may be performed to form m longitudinal layers on the stack of the n transverse layers. Here, the sum of the number of the transverse layers and the number of the longitudinal layers is not limited to a predetermined value. That is, the numbers of the transverse layers and the longitudinal layers are not particularly limited. Here, m and n preferably have a relationship of m>n, m=n, or m<n.

When printing the thermoplastic polymer material in the transverse direction and the longitudinal direction on the specimen 110 as in Step S102, at least one anisotropic printing region 320 is set within each isotropic printing region 310 to cause local thermal transformation as illustrated in FIGS. 3(A)-(D), and anisotropic printing is performed within the anisotropic printing region 320. In this case, the isotropic printing region 310 has a laminate structure in which multiple +45° oblique layers 310a formed along a +45° oblique printing path (see the figure labeled FIG. 3(B)) and multiple −45° oblique layers 310a formed along a −45° oblique printing path (see the figure labeled FIG. 3(C)) are alternately laminated. That is, in the isotropic printing region 310, the printed layers are laminated in a fashion of +45°/−45°/+45°/−45°/and so on.

The anisotropic printing region 320 has a laminate structure in which multiple transverse layers (i.e., 90° layers) 320a formed along a longitudinal path (see the figure labeled FIG. 4(A)) and multiple longitudinal layers (i.e., 0° layers)

formed along a longitudinal path (see the figure labeled FIG. 4(B)) are laminated. In the laminate structure, the printed layers may be stacked in a fashion of 90°/90°/0°/0°. The laminate structure in which the multiple transverse layers 320a and the multiple longitudinal layers 320b are stacked may be a structure in which n longitudinal layers are stacked on m transverse layers. The laminate structure is not limited to the structure in which the n longitudinal layers are stacked on the m transverse layers. There can be many variations in the laminate structure. For example, m longitudinal layers may be stacked on n transverse layers. Here, m and n may have a relationship of m>n, m=n, or m<n.

When the 3D printing is completed, the 3D printed product is heated so that the 3D printed product undergoes thermal transformation in a specific direction (Step S103).

In order to cause the thermal transformation of the 3D printed product in a specific direction by heating the 3D printed product, the degree of thermal transformation in each direction is controlled by varying a ratio of the number of the transverse layers and the number of the longitudinal layers as described above.

Further, when the 3D printed product is heated, the heating may be performed at a temperature equal to or higher than the glass transition temperature of the polymer of the 3D printed product for a certain period of time. For example, the heating can be carried out at a temperature of 150° C. for 15 minutes. However, the present invention is not limited to the case where the heating is carried out at a temperature of 150° C. for 15 minutes. The temperature and the heating time may vary depending on the conditions under which the 4D printing method of the present invention is performed or objects to which the 4D printing method of the present invention is applied.

In the heating of the 3D printed product, the heating may be performed in such a manner that a light irradiating device heats the 3D printed product with light. In this case, as illustrated in FIG. 5, the light irradiating device includes a light source 510 for emitting a light ray and a lens 520 for changing a ray path of the light emitted from the light source 510 such that the light ray is directed to the 3D printed product 590. The distance from the 3D printed product 590 to the lens 520 disposed above the 3D printed product 590 is adjusted to control the area of a light receiving region. An example of the light source 510 is an infrared (IR) lamp that emits IR rays. An example of the 3D printed product 590 is a laminate structure in which multiple transverse layers 590a and multiple longitudinal layers 590b are laminated. In FIG. 5, reference numerals 530, 540, 550, 560, 570, and 580 respectively denote a reflector, a lens holder, a lens height adjuster, an upper plate, a lower plate, and a support column.

Figure 6:
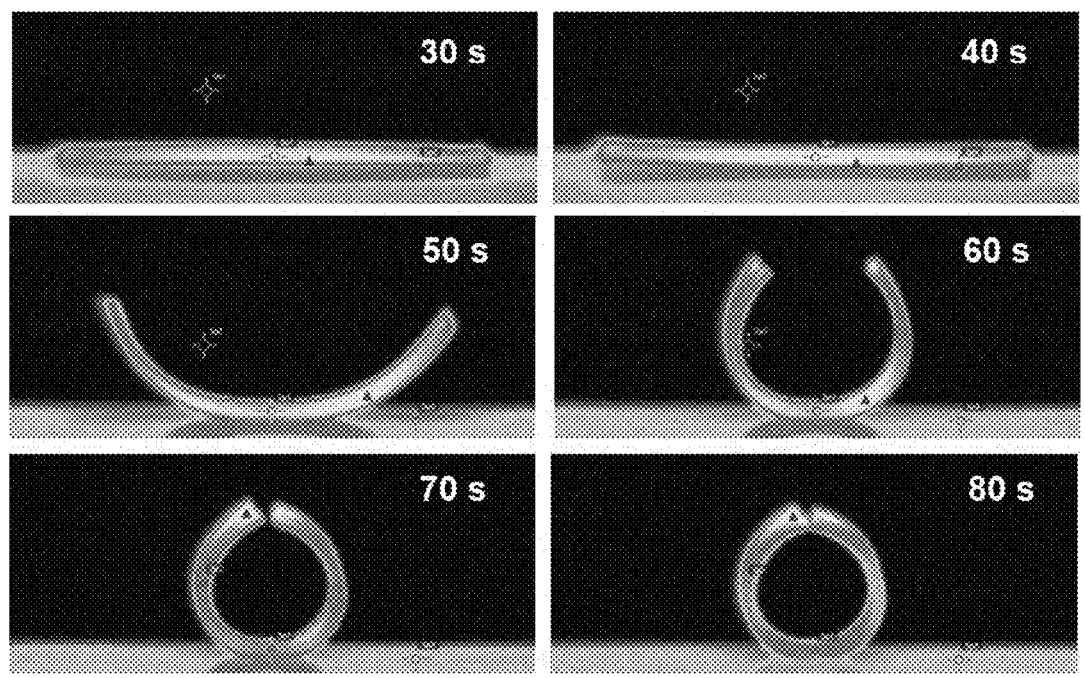
FIG. 6 is a view illustrating thermal transformation over time when a 3D printed product is heated by the infrared light irradiating device illustrated in FIG. 5.

FIG. 6 is a diagram illustrating a process in which thermal transformation occurs over time when a 3D printed product is heated by the infrared light irradiating device illustrated in FIG. 5.

Referring to FIG. 6, according to the results of an experiment, it took about 15 minutes for a 3D printed product to transform as desired when heat treatment is performed with a conventional heating furnace, whereas it took about 80 seconds (i.e., 1 minute and 20 seconds) for the 3D printed product to experience similar thermal transformation when heat treatment is performed with the infrared light irradiating device illustrated in FIG. 5. The results show that the method according to the present invention reduces the heating time required to cause the thermal transformation to about 1/10 in comparison with the conventional method.

Figure 7:
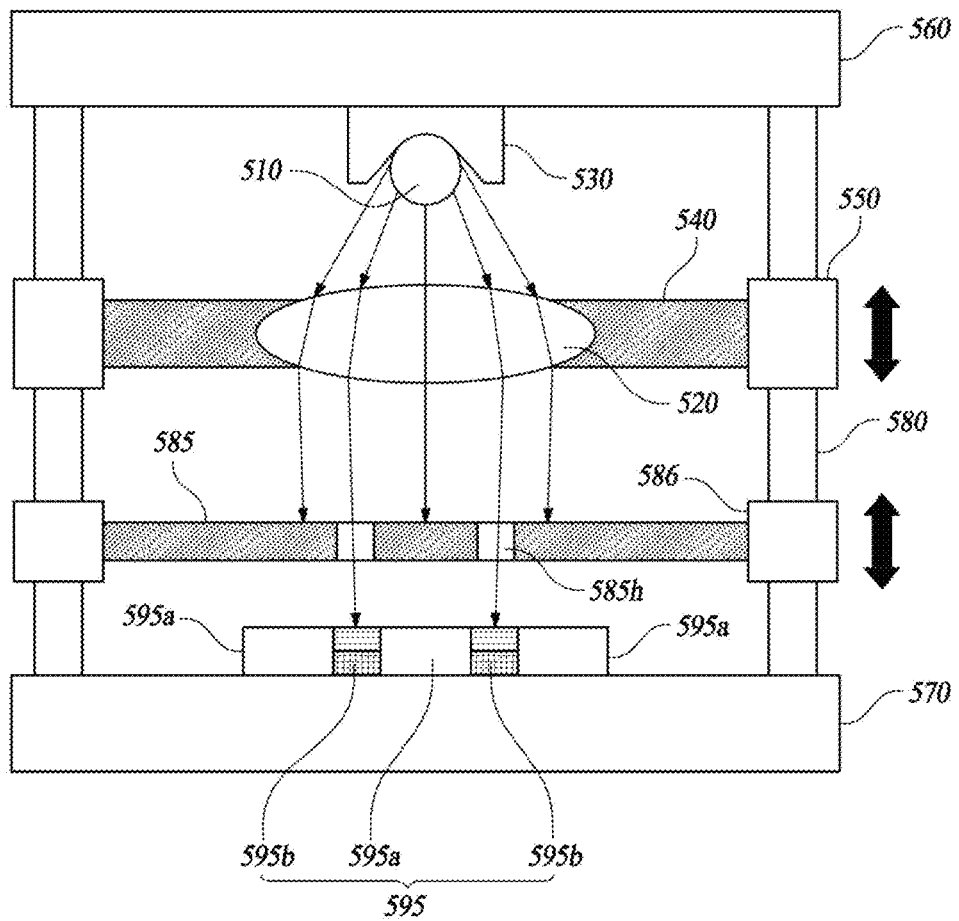
FIG. 7 is a view illustrating another embodiment of the light irradiating device used in the 4D printing method according to the present invention.

FIG. 7 is a diagram illustrating another embodiment of the light irradiating device used in the 4D printing method of the present invention.

Referring to FIG. 7, in the case of heating through the light irradiation, when a 3D printed product 595 is an object having an isotropic printing region 595a and an anisotropic printing region 595b, the light irradiating device may be composed of a light source 510 for emitting a light ray, a lens 520 for changing the traveling path of the light ray emitted from the light source 510 such that the light ray is directed to the 3D printed product 595, and a mask 585 having a through hole 585h that transmits only a part of the light ray passing through the lens 520. The mask 585 is used to focus the light ray only on the anisotropic printing region 595b. In FIG. 7, reference numeral 530 denotes a reflector, reference numeral 540 denotes a lens holder, reference numeral 550 denotes a lens height adjuster, reference numeral 560 denotes an upper plate, reference numeral 570 denotes a lower plate, reference numeral 580 denotes a support column, and reference numeral 586 denotes a mask height adjuster.

Figure 8:
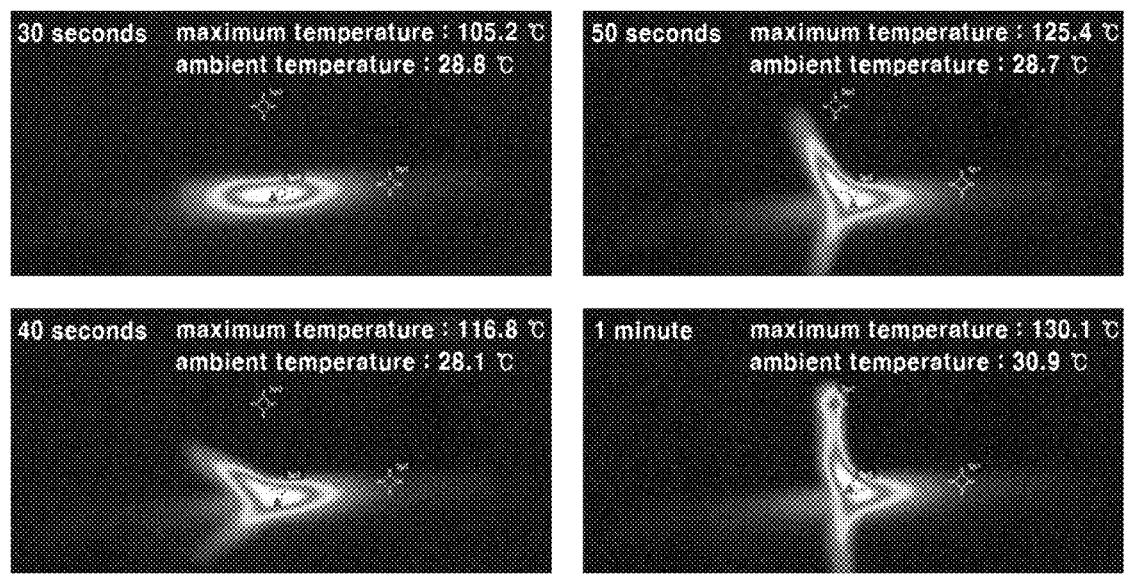
FIG. 8 is a view illustrating a process of causing local thermal transformation of a 3D printed product by locally heating the 3D printed product using the light irradiating device illustrated in FIG. 7.

FIG. 8 is a view illustrating a process of locally heating a 3D printed product with the light irradiating device shown in FIG. 7 to cause local thermal transformation of the 3D printed product.

Referring to FIG. 8, by irradiating only the anisotropic printing region 595b with the light (e.g., infrared) by using the mask 585 as shown in FIG. 7, local thermal transformation occurs over time.

Referring again to FIG. 1, when a 3D printed product is heated through the above-described process and a thermal transformation occurs in a specific direction in the 3D printed product, a 4D printed product having a desired final shape which is formed through the thermal transformation is obtained by controlling the heating time (Step S104).

When obtaining a 4D printed product having a desired final shape formed through the anisotropic thermal transformation, as illustrated in FIGS. 9 and 10, a 3D printed product having ability to cause local thermal transformation, that is, a 3D printed product in which an anisotropic printing region 320 is formed within isotropic printing region 310, is applied to a base component 301, 302 having a specific shape with at least one folding region 301f, 302f. When the 3D printed product experiences local thermal transformation corresponding to the folding region, the 3D printed product is automatically assembled with the base component 301, 302. Thus, an assembly (corresponding to an integrated 4D product) of the 4D printed product and the base component can be obtained.

Figure 11A:
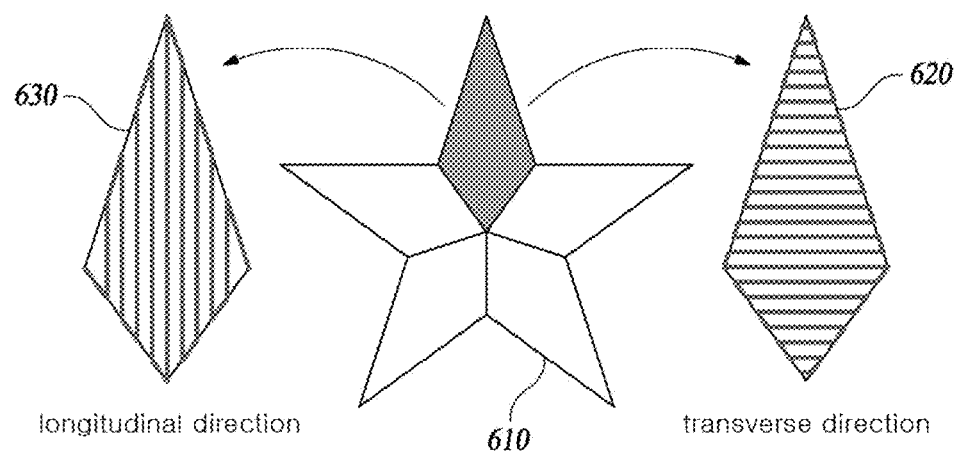
FIGS. 11A and 11B are views illustrating longitudinal and transverse printing paths and a process of implementing 4D printing by applying the 4D printing method according to the present invention to an object having a specific shape.
Figure 11B:
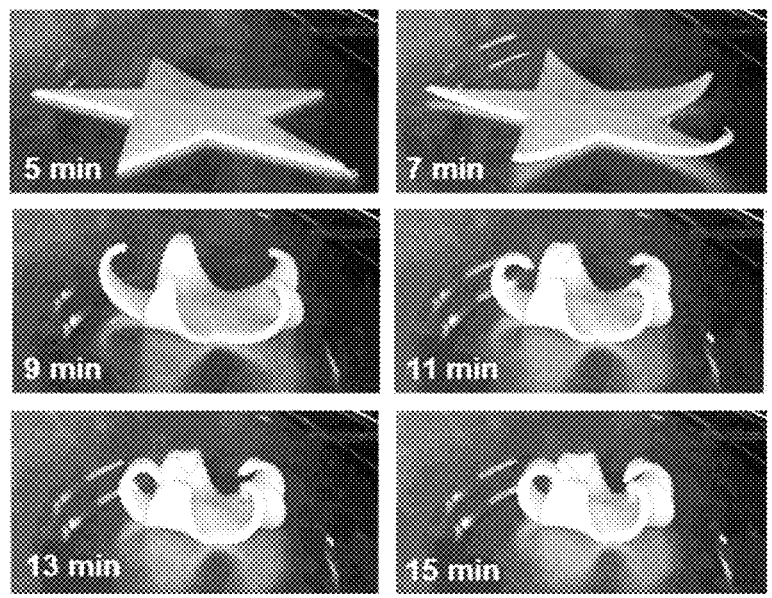

FIGS. 11A and 11B are diagrams illustrating longitudinal and transverse printing paths and a process of implementing 4D printing by applying the 4D printing method according to the present invention to a component with a specific shape.

Referring to FIG. 11A, the 4D printing method using thermal anisotropy and thermal transformation, according to the present invention, can be applied to a star-shaped specimen 610. That is, transverse layers 620 and longitudinal layers 630 are sequentially printed on the star-shaped specimen 610, and the star-shaped specimen 610 is heated to undergo thermal transformation. Depending on the heating time, the star-shaped specimen transforms into a different form. As illustrated in FIG. 11B, the form of the star-shaped specimen changes over time, which mimics a motion of a starfish. FIG. 11B illustrates the forms of the star-shaped specimen at heating times of 5 minutes, 7 minutes, 9 minutes, 11 minutes, 13 minutes, and 15 minutes, respectively.

Figure 12:
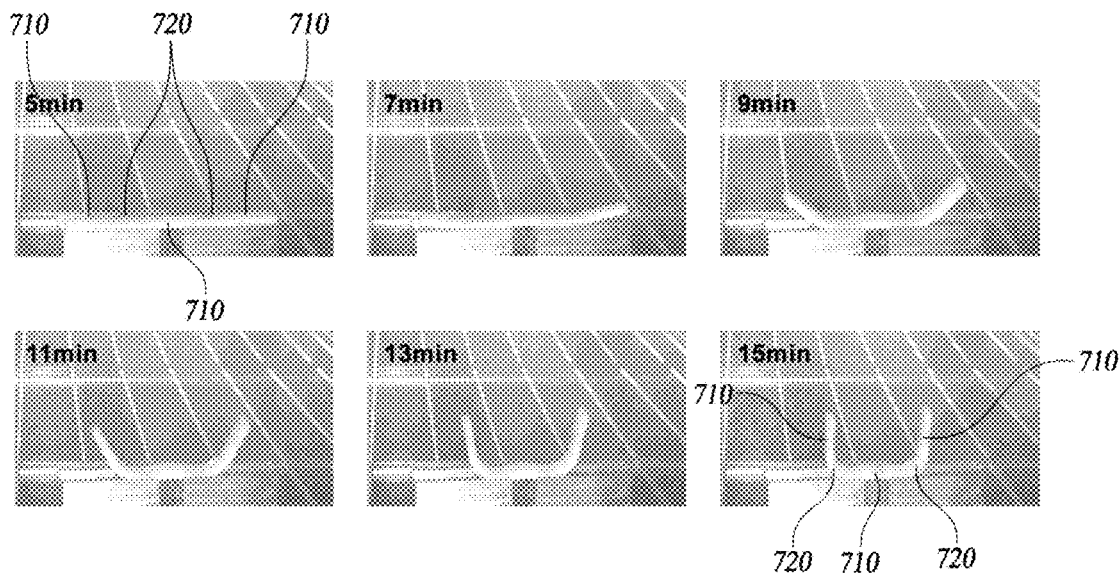
FIG. 12 is a view illustrating a process of implementing local thermal transformation by printing anisotropic regions within isotropic regions, regarding the 4D printing method according to the present invention.

FIG. 12 is a view illustrating a process of causing a local thermal transformation of a composite bar that contains anisotropic and isotropic printing regions, regarding the 4D printing method according to the present invention.

Referring to FIG. 12, in the 4D printing method using thermal anisotropy and thermal transformation, according to the present invention, when anisotropic printing regions 720 are formed in isotropic printing regions 710 in a specimen and the specimen is locally heated for a certain period of time, local thermal transformation gradually occurs in the specimen over heating time (5 minutes→7 minutes→9 minutes→11 minutes→13 minutes→15 minutes), thereby producing a 4D printed product with a desired shape. That is, since the local thermal transformation occurs only in the anisotropic printing regions 720, the 4D printed product that is folded rather than curled (i.e., continuously bent) is obtained.

Figure 13:
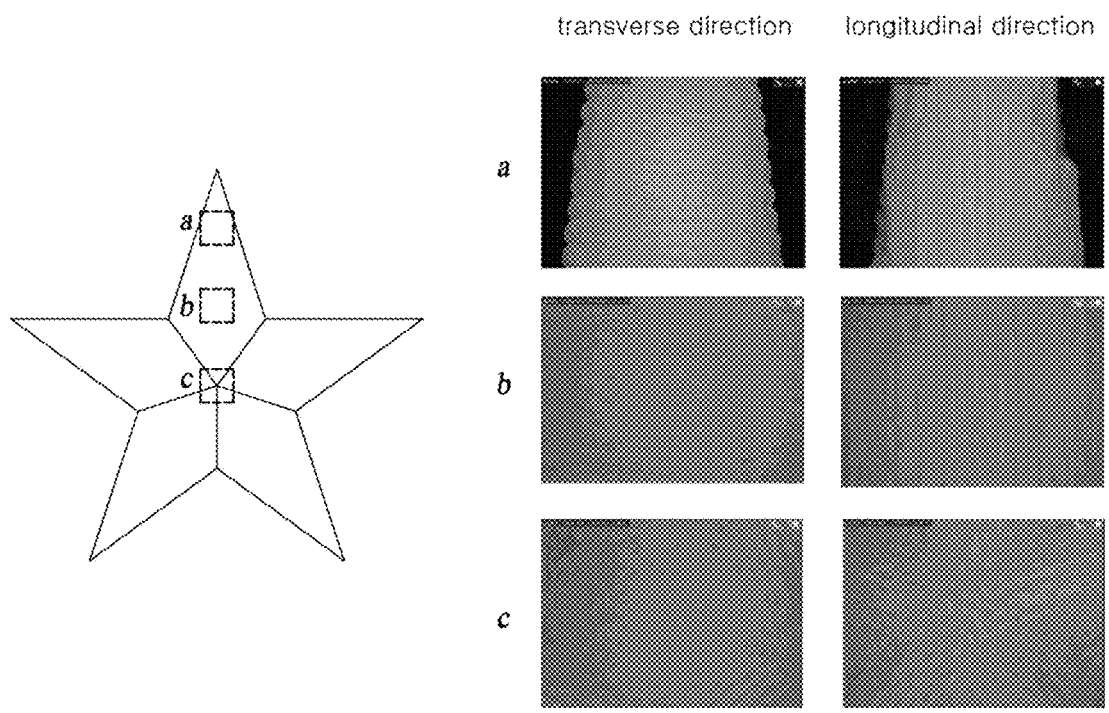
FIG. 13 are microscopic photographs of a 4D printed product obtained by applying the 4D printing method of the present invention to an object having a specific shape.

FIG. 13 is a photomicrograph of an example of a product fabricated through the 4D printing method using thermal anisotropy and thermal deformation, according to the present invention.

Specifically, FIG. 13 is a microscopic photograph of a 4D printed product fabricated by applying the 4D printing method of the present invention to a specific shape, for example, a star shape. In the partial excerpted enlarged photographs of the regions a, b, and c, the transverse and longitudinal printing directions can be identified.

Hereinafter, regarding the 4D printing method using the thermal anisotropy and thermal deformation according to the present invention, the bending transformation of an anisotropic laminate specimen will be described in more detail.

FIG. 14 illustrates the shape change with heating time for an anisotropically printed specimen composed of three transversely printed layers and five longitudinally printed layers. As illustrated in FIG. 14, both longitudinal ends of a bar specimen begin to bend after 7 minutes of heating. This means that the bar specimen is sufficiently heated to overcome its own weight after 7 minutes of heating so that thermal transformation starts. That is, the increase in length of a lower region (transversely printed region) and the decrease in length of an upper region (longitudinally printed region) result in a bending transformation. This bending transformation continues for a predetermined heating time. After the heating is completed, the rectangular bar shape of the specimen changes into an oval shape as illustrated in FIG. 14.

This bending behavior was further investigated by varying the ratio of the transverse layers to the longitudinal layers. Three rectangular bars were prepared in which the ratios of transverse to longitudinal layers were respectively 3:5, 4:4, and 5:3. The resulting shape changes of these rectangular bars are shown in FIG. 15. The results of the investigation show that the degree of bending increases as the number of layers printed in the transverse direction increases. This tendency can be interpreted by using an analytical model based on simple strain assumptions.

Figure 16:
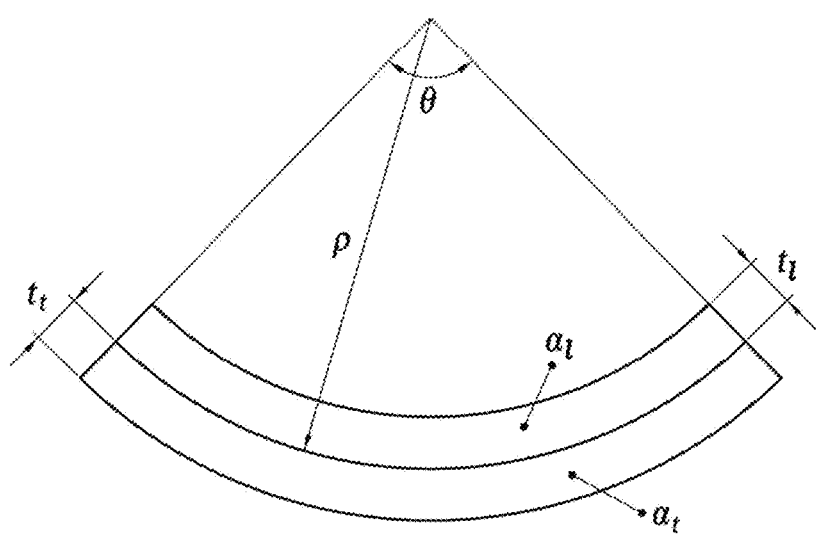
FIG. 16 is a diagram illustrating a pure bending model used to describe anisotropic bending deformation.

FIG. 16 shows a pure bending model of an object composed of two materials with different thermal expansion coefficients $\alpha_l$ and $\alpha_t$ where the subscripts l and t represent the longitudinal and transverse printing paths, respectively.

Thermal deformation of a beam with an initial length L under the condition of a temperature change of $\Delta T$ is expressed by Equation 1 shown below when the beam is a longitudinally and transversely printed bar.

$$L_l = L(1 + \alpha_l \Delta T) = \left(\rho - \frac{t_l}{2}\right)\theta \qquad \text{[Equation 1]}$$

$$L_t = L(1 + \alpha_t \Delta T) = \left(\rho + \frac{t_t}{2}\right)\theta$$

Here, $L_l$ and $L_t$ are changes in lengths of each bar under the temperature change of $\Delta T$. Here, $\rho$ and $\theta$ are the radius of curvature and the corresponding angle of the bent (curved) beam, respectively. These two equations combine to generate Equation 2 shown below.

$$\rho = \frac{t_l + t_t}{2(\alpha_t - \alpha_l)\Delta T} + \frac{\alpha_t t_l + \alpha_l t_t}{2(\alpha_t - \alpha_l)} \qquad \text{[Equation 2]}$$

In Equation 2, the first term does not vary under a given lamination condition (for example, $t_l + t_t = 1.6$ mm), and the second term varies depending on the combination of layers in a laminate. Therefore, as $t_l$ increases, the radius of curvature increases, and $t_t$ decreases because $\alpha_l$ is a negative value and $\alpha_t$ is a positive value. This explains the result of the shape change of FIG. 10. That is, it means that the transversely printed layers cause more severe bending deformation (i.e., smaller radius of curvature).

As described above, the 4D printing method using thermal anisotropy and thermal deformation, according to the present invention, can be applied to a case where a 4D printed product is produced without using a dedicated apparatus (i.e., printer) and a specific dedicated material for 4D printing. That is, by using the 4D printing method according to the present invention, it is possible to implement 4D printing at low cost because general materials and equipment (for example, an FDM 3D printer using thermoplastic polymer filaments) are used to produce a 3D object to which anisotropy is artificially imposed and then the 3D object is heat-treated to transform in a specific direction. Therefore, the present invention enables fabrication of various multifunctional products using an FDM printer and various engineering plastics that can be printed with the FDM printer.

In addition, the 4D printing method of the present invention can realize 4D printing by using a commercial FDM printer and thermoplastic filaments and controlling only the printing path, without requiring 4D printing material or dedicated equipment (3D printer). Therefore, the present invention can be easily used to enable 4D printing with low cost.

In addition, while conventional 4D printing methods exhibit reversible transformations, the 4D printing method according to the present invention shows non-reversible transformations. Therefore, the 4D printing method according to the present invention is advantageous in that it can be used to produce 4D printed products requiring a permanent transformation.

While the present invention has been described with reference to exemplary embodiments, those ordinarily skilled in the art will appreciate that the present invention is not limited to the disclosed exemplary embodiments but many variations and modifications thereof may be made without departing from the spirit and scope of the present invention. Accordingly, the true scope of protection of the present invention should be construed according to the following claims, and all technical ideas within the scope of the same should be construed as falling within the scope of the present invention.

What is claimed is:

1. A 4D printing method using thermal anisotropy and thermal transformation, the method comprising:
    (a) artificially planning transverse printing paths and longitudinal printing paths on a specimen to impose a desired thermal anisotropy to the specimen;
    (b) printing, by using a fused deposition modeling (FDM) 3D printer, a thermoplastic polymer in a transverse direction and a longitudinal direction on the specimen to form multiple transversely printed layers and multiple longitudinally printed layers, thereby building a 3D printed product;
    (c) heating the 3D printed product to cause thermal transformation of the 3D printed product in a specific direction; and
    (d) controlling heating time to obtain a 4D printed product having a desired final shape generated through the transformation after the heating is completed,
    wherein, after the heating, one of a length and a width of the printed thermoplastic polymer is increased, and other of the length and the width of the printed thermoplastic polymer is decreased,
    wherein in the (b), the printing of the thermoplastic polymer in the transverse direction and the longitudinal direction is performed by setting at least one anisotropic printing region within the isotropic printing regions to cause local thermal transformation and by performing anisotropic on the anisotropic printing region.

2. The 4D printing method according to claim 1, wherein in the (b), the thermoplastic polymer is a form of a filament.

3. The 4D printing method according to claim 1, wherein each of the isotropic regions has a laminate structure composed of multiple +45° oblique layers printed along a +45° oblique printing path and multiple −45° oblique layers printed along a −45° oblique printing path, wherein the +45° oblique layers and the −45° oblique layers are alternately laminated.

4. The 4D printing method according to claim 1, wherein the anisotropic printing region has a laminate structure composed of multiple transverse layers printed along a transverse printing path and multiple longitudinal layers printed along a longitudinal printing path, wherein the transverse layers and the longitudinal layers are sequentially laminated.

5. The 4D printing method according to claim 1, wherein in the (c), in the heating of the 3D printed product to cause the thermal transformation of the 3D printed product in the specific direction, a degree of the thermal transformation is controlled by adjusting the number of transverse layers and the number of longitudinal layers.

6. The 4D printing method according to claim 1, wherein in the (c), in the heating of the 3D printed product, the heating is performed for a predetermined period of time at a temperature equal to or higher than a glass transition temperature of the thermoplastic polymer.

7. The 4D printing method according to claim 1, wherein in the (c), in the heating of the 3D printed product, a light irradiating device is used to heat the 3D printed product using light energy.

8. The 4D printing method according to claim 7, wherein the light irradiating device comprises: an infrared lamp and a lens for changing a path of a light ray emitted from the infrared lamp such that the light ray is focused to the 3D printed product, and a light irradiation region is controlled by adjusting a distance between the 3D printed product and the lens disposed above the 3D printed product.

9. The 4D printing method according to claim 7, wherein during the heating of the 3D printed product using light energy, when the 3D printed product is a product having isotropic printing regions and anisotropic printing regions, the light irradiating device comprises: an infrared lamp, a lens for changing a path of a light ray emitted from the infrared lamp such that the light ray is focused to the 3D printed product, and a mask having through-holes for transmitting only a part of the light ray passing through the lens, wherein the light ray is irradiated only on the anisotropic printing region by the mask.

10. The 4D printing method according claim 1, wherein in the (d), in the obtaining of the 4D printed product having the desired final shape through the anisotropic thermal transformation, the specimen having an ability to cause local thermal transformation is applied to a base component having a specific shape with at least one folding region where the specimen is automatically assembled with the base component due to the local thermal transformation of the specimen corresponding to the folding region, thereby producing an integrated 4D product.

11. A 4D printing method using thermal anisotropy and thermal transformation, the method comprising:
    (a) artificially planning transverse printing paths and longitudinal printing paths on a specimen to impose a desired thermal anisotropy to the specimen;
    (b) printing a thermoplastic polymer in a transverse direction and a longitudinal direction on the specimen to form multiple transversely printed layers and multiple longitudinally printed layers, thereby building a 3D printed product;
    (c) heating the 3D printed product to cause thermal transformation of the 3D printed product in a specific direction; and
    (d) controlling heating time to obtain a 4D printed product having a desired final shape generated through the transformation after the heating is completed,
    wherein in the (d), in the obtaining of the 4D printed product having the desired final shape through the anisotropic thermal transformation, the specimen having an ability to cause local thermal transformation is applied to a base component having a specific shape with at least one folding region where the specimen is automatically assembled with the base component due to the local thermal transformation of the specimen corresponding to the folding region, thereby producing an integrated 4D product.

12. The 4D printing method according to claim 11, wherein in the (b), the thermoplastic polymer is a form of a filament.

* * * * *